United States Patent
Pfadler et al.

(10) Patent No.: US 12,526,725 B2
(45) Date of Patent: Jan. 13, 2026

(54) METHOD FOR A RELAYING SYSTEM FOR IMPROVING AN AWARENESS OF THE RELAYING SYSTEM BY USER EQUIPMENT, METHOD FOR USER EQUIPMENT, APPARATUS, VEHICLE AND COMPUTER PROGRAM

(71) Applicant: VOLKSWAGEN AKTIENGESELLSCHAFT, Wolfsburg (DE)

(72) Inventors: Andreas Pfadler, Berlin (DE); Luca Montero Bayo, Barcelona (ES)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 373 days.

(21) Appl. No.: 18/147,753

(22) Filed: Dec. 29, 2022

(65) Prior Publication Data
US 2023/0217348 A1      Jul. 6, 2023

(30) Foreign Application Priority Data
Dec. 30, 2021   (EP) .................................... 21218319

(51) Int. Cl.
*H04W 40/24*      (2009.01)
*H04W 40/22*      (2009.01)

(52) U.S. Cl.
CPC ......... *H04W 40/246* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 2011/0003545 A1* | 1/2011 | Vainikka | H04W 48/20 455/7 |
| 2017/0012657 A1* | 1/2017 | Stählin | G08G 1/161 |
| 2018/0167790 A1* | 6/2018 | Cavalcanti | H04W 4/44 |
| 2019/0096243 A1* | 3/2019 | Doig | G08G 1/09 |
| 2019/0349794 A1* | 11/2019 | Tavares Coutinho | H04L 67/52 |
| 2020/0100167 A1 | 3/2020 | Cheng et al. | |
| 2020/0314728 A1* | 10/2020 | Reimann | H04W 40/12 |
| 2021/0176820 A1* | 6/2021 | Zhang | H04W 8/005 |
| 2024/0314576 A1* | 9/2024 | Ramachandran | H04W 64/003 |

FOREIGN PATENT DOCUMENTS

WO      2021162506 A1      8/2021

OTHER PUBLICATIONS

Extended European Search Report; European Patent Application No. 21218319.8; Jun. 20, 2022.

* cited by examiner

*Primary Examiner* — Brian S Roberts
(74) *Attorney, Agent, or Firm* — BARNES & THORNBURG LLP

(57) ABSTRACT

A method for a relaying system. The method for improving an awareness of the relaying system by user equipment includes encoding information about a relaying service in a vehicle-to-everything message and transmitting the vehicle-to-everything message to the user equipment to improve user equipment's awareness of the relaying system's relaying service.

14 Claims, 2 Drawing Sheets

METHOD FOR A RELAYING SYSTEM FOR IMPROVING AN AWARENESS OF THE RELAYING SYSTEM BY USER EQUIPMENT, METHOD FOR USER EQUIPMENT, APPARATUS, VEHICLE AND COMPUTER PROGRAM

PRIORITY CLAIM

This patent application claims priority to European Patent Application No. 21218319.8, filed 30 Dec. 2021, the disclosure of which is incorporated herein by reference in its entirety.

SUMMARY

Illustrative embodiments relate to the field of wireless communication. Illustrative embodiments relate to a method for a relaying system for improving an awareness of the relaying system by user equipment, a method for user equipment, an apparatus, a transportation vehicle and a computer program, more particularly, but not exclusively, to a concept for improving an awareness of the relaying system (RS) by user equipment (UE).

BRIEF DESCRIPTION OF THE DRAWINGS

Disclosed embodiments will be described in more detail below with reference to the accompanying figures, in which.

DETAILED DESCRIPTION

Figure 1:
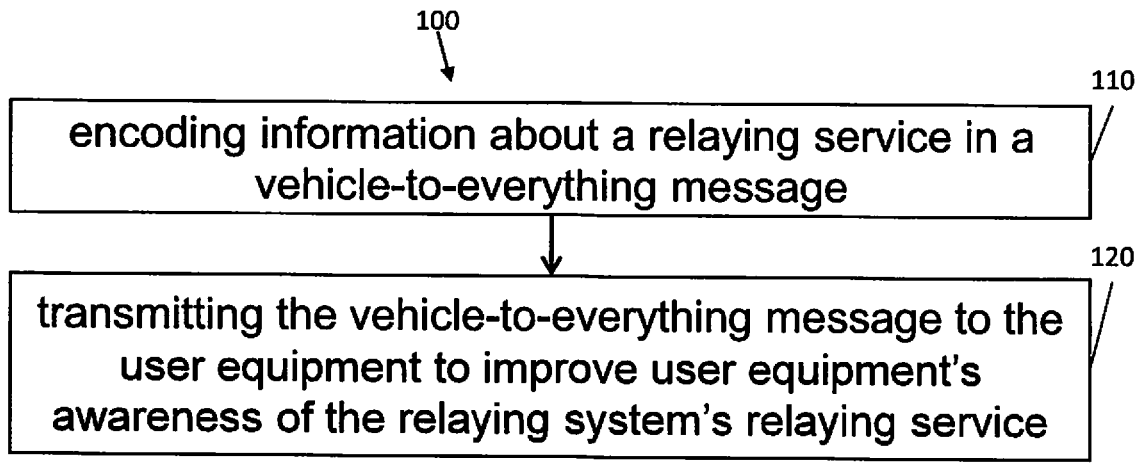
FIG. 1 shows an exemplary embodiment of a method for a relaying system.

The development of the 5th-generation mobile communication standard (5G) of the 3rd-Generation Partnership Project (3GPP) has brought increased attention to the automotive industry, as vehicular communications are expected to leverage the most advanced features of the new generation of wireless communications. Among the main novelties of 5G, a wider range of usable spectrum (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing transportation vehicles to make use of the same spectrum options, even for Vehicle-to-Vehicle (V2V) use cases.

The use of higher frequency bands in communications implies propagating in a harsher channel, where the free-space path loss scales with the frequency squared (f2), and shading by obstacles and atmospheric effects (i.e., water vapor and oxygen absorption, or rain) take a non-negligible role.

Services relying on higher frequency systems, with their inherently high channel-induced attenuation, might find is challenging to deliver satisfactory QoS in some situations where signal power attenuation is increased, lowering the received Signal-to-Noise Ratio. This has sometimes motivated externalizing antennas for diverse services (such as 802.11p V2X, tolling, GPS and other services).

It is thus worth considering that user equipment may use a relaying system for established a connection with a desired QoS. For example, a user equipment located inside a transportation vehicle, which is equipped with a relaying system, may establish to the relaying system of the transportation vehicle.

US 2020/0 100 167 A1 discloses a transmitting device, which may determine a zone identifier (ID) for the transmitting device and transmit a message including the zone ID directly to at least one receiving device. In certain disclosed embodiments, a relay device may be configured to receive the message comprising a first zone ID for a transmitting device, to determine whether to relay the message based at least on the first zone ID, and if the relay device determines to relay the message, to transmit a relayed message including information reflecting the first zone ID. In certain disclosed embodiments, a receiving device may be configured to identify a message comprising information indicating a first zone ID for a transmitting device, to determine whether to decode data of the message based at least on the first zone ID for the transmitting device, and to decode or refrain from decoding the data of the message based on the determination.

US 2018/0167790 A1 discloses a proxy coordinated Wireless communication operation. A first user equipment receives a proxy operation authorization from a vehicular environment proximity services function for the first user equipment to operate as a Proxy for the proximity services function. The first user equipment then controls configuration information of other user equipment. The first user equipment also controls the vehicular operation mode used by the other user equipment.

WO 2021/162506 A1 discloses a remote UE operation method in a wireless communication system. The method comprises operations in which a remote UE receives at least one discovery message and a relay UE is selected on the basis of the at least one discovery message. The discovery message includes information related to the minimum communication range (MCR) of a source UE. The remote UE is included in the range of the MCR and the selected relay UE has a signal strength greater than or equal to that of a preset value and is included in the range of the MCR.

US 2019/096243 A1 discloses a method at a computing device for the computing device to act as an intelligent transportation system (ITS) station for a transportation vehicle. The method includes detecting that the computing device is proximate to the transportation vehicle, determining whether ITS messages are being sent on behalf of the transportation vehicle and if the determining finds ITS messages are not being sent on behalf of the transportation vehicle, the computing device acting as the ITS station for the transportation vehicle.

However, user equipment may be not aware of possible relaying systems, which the user equipment could possibly use to establish a connection to, to use them, e.g., for a relaying service.

It is therefore a finding that an awareness of the relaying system by user equipment can be improved by use of a vehicle-to-everything (V2X) message. This way, the user equipment can be informed by the relaying system, of the presence of the relaying system itself, e.g., a transportation vehicle acting as relaying system. Thus, an awareness of the relaying system by the user equipment can be improved, especially if a proper connection could be established between the relaying system and the user equipment (else the user equipment may not receive the information from the relaying system).

Examples provide a method for a relaying system for improving an awareness of the relaying system by user equipment. The method comprises encoding information about a relaying service in a vehicle-to-everything message and transmitting the vehicle-to-everything message to the user equipment to improve user equipment's awareness of the relaying system's relaying service. Thus, the UE can receive an information from the relaying system, especially if a connection between the relaying system and the UE could be established. By receiving the information by a V2X-message an awareness of the relaying system by the user equipment can be increased, e.g., the relaying system can disseminate (e.g., advertise) information about its own relaying service.

In an example, the information about the relaying service may be encoded in a container of a cooperative awareness message (CAM). Thus, the RS can beneficially embed the information.

In an example, the information about the relaying service may be encoded in an extension of a cooperative awareness message. Thus, the RS can beneficially embed the information.

In an example, the information about the relaying service may comprise information about a relaying service characteristic. Thus, the RS can inform the UE, e.g., about different possible relaying services, such that the UE can chose a desired relaying service characteristic.

In an example, the method may further comprise receiving a vehicle-to-everything message from the user equipment comprising information about a relaying request, decoding the received vehicle-to-everything message and establishing a relaying service based on the received vehicle-to-everything message. Thus, the RS can receive information from the UE and can establish a communication link with the UE based on the UE's request.

In an example, the received vehicle-to-everything message from the user equipment may further comprise information about a desired relaying service characteristic. Further the method may comprise selecting a relaying service for acting as relaying system for the user equipment based on the desired relaying service characteristic. This way, the RS can establish a communication link with the UE using a relaying service that meets a need of a UE's user.

Examples relates to a method for user equipment for improving a user equipment's awareness for a relaying system. The method comprises receiving a vehicle-to-everything message from the relaying system comprising information about a relaying system's relaying service and decoding the vehicle-to-everything message to determine information about the relaying system's relaying service. This way, the UE can receive information from possible relaying systems using V2X-messages, which may increase the UE's awareness of possible RS in its environment.

In an example, the method may further comprise receiving information about a type of the vehicle-to-everything message and sensing for this type of vehicle-to-everything message to receive information about a relaying system's relaying service. This way, the UE can be informed about a predefined type of the vehicle-to-everything message, which enables the UE to sense only for V2X-messages, which can be used to disseminate information about relaying systems.

In an example, the information about a type of the vehicle-to-everything message is received from a network entity and/or the relaying system. This way, the UE can be informed in advance about a possible type of the V2X-message, e.g., if the UE is not in a coverage of the network entity.

In an example, the method may further comprise encoding information about a relaying request in a vehicle-to-everything message and transmitting the vehicle-to-everything message to the relaying system. This way, the UE can inform the RS about a desired relaying service.

In an example, the method may further comprise encoding information about a desired relaying service characteristic in the vehicle-to-everything message. This way, the UE can inform the RS about a desired characteristic of a relaying service, e.g., a QoS of the relaying service.

In an example, the vehicle-to-everything message may be a cooperative awareness message. This way, the UE can beneficially embed the information about a relaying request/desired relaying service characteristic.

Examples further provide an apparatus, comprising one or more interfaces configured to communicate with user equipment or a relay system. The apparatus further comprises processing circuitry configured to control the one or more interfaces and to perform the method for a RS or UE as described above. Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

FIG. 1 shows an example of a method for improving an awareness of the relaying system by user equipment. The method 100 comprises encoding 110 information about a relaying service in a vehicle-to-everything message and transmitting 120 the vehicle-to-everything message to the user equipment to improve user equipment's awareness of the relaying system's relaying service. This way, the UE can receive information about an available RS using, e.g., ETSI standard and not only by using the 3GPP standard.

The RS may communicate in a mobile communication system with a base station. For example, the RS and the base station may communicate in/via a mobile communication system. The mobile communication system may comprise a plurality of transmission points and/or base stations operable to communicate radio signals with UE and/or RS, such as the RS. In an example, the mobile communication system may comprise the RS and the UE.

A base station can be located in the fixed or stationary part of the network or system. A base station may correspond to a remote radio head, a transmission point, an access point, a macro cell, a small cell, a micro cell, a pico cell, a femto cell, a metro cell etc. The term small cell may refer to any cell smaller than a macro cell, e.g., a micro cell, a pico cell, a femto cell, or a metro cell. Moreover, a femto cell is considered smaller than a pico cell, which is considered smaller than a micro cell. A base station can be a wireless interface of a wired network, which enables transmission and reception of radio signals to a UE, such as a UE, or RS. Such a radio signal may comply with radio signals as, for example, standardized by 3GPP or, generally, in line with one or more of the above listed systems. Thus, a base station may correspond to a NodeB, an eNodeB, a BTS, an access point, etc. A RS may correspond to an intermediate network node in the communication path between a base station and UE. A RS may forward a signal received from a UE to a base station, signals received from the base station to the mobile station transceiver, respectively.

In some examples, the RS may also act as a small cell base station, e.g., as a pico cell or femto cell base station. In some examples, the RS may act as signal relay between the UE and a base station. In some examples, the RS may support simultaneous connections to multiple base stations (of the same or different mobile network operators) and/or simultaneous connections to the same base station over multiple radio access technologies (e.g., a mmWave-based and a sub-6 GHz-based connection at the same). In particular, the RS may be associated with, and thus suitable for or configured to connecting/connect to, two or more wireless base stations of two or more mobile network operators. Additionally or alternatively, the RS may be associated with, and thus suitable for or configured to connecting/connect to, one or more base stations using two or more (different) radio access technologies. In some examples, the RS may act as a (internet protocol-based) gateway, suitable for data communication via two or more mobile network operators and/or two or more radio access technologies.

The mobile communication system may be cellular. The term cell refers to a coverage area of radio services provided by a transmission point, a remote unit, a remote head, a remote radio head, a base station, RS or a NodeB, an eNodeB, respectively. The terms cell and base station may be used synonymously. In some examples a cell may correspond to a sector. For example, sectors can be achieved using sector antennas, which provide a characteristic for covering an angular section around a base station or remote unit.

In some examples, a base station or remote unit may, for example, operate three or six cells covering sectors of 120° (in case of three cells), 60° (in case of six cells) respectively. Likewise a RS, may establish one or more cells in its coverage area. UE can be registered or associated with at least one cell, e.g., it can be associated to a cell such that data can be exchanged between the network and the mobile in the coverage area of the associated cell using a dedicated channel, connection or connection. UE may hence register or be associated with a RS, such as the RS, or a base station directly or indirectly, where an indirect registration or association may be through one or more RS.

Various examples of the RS may improve the cellular coverage of the UE. A RS may be used to connect multiple terminals (e.g., multiple terminals) and provide an aggregated connection to a stationary cellular communication, for example, over one or more external vehicle antennas, of the transportation vehicle the RS is integrated into.

Such a RS may, for example, correspond to a relay as defined in 3GPP Release 10 and following, e.g., a moving relay or mobile relay as introduced in connection with 3GPP Release 12 and following, a wireless repeater (analog or digital), or a femto cell with a wireless backhaul connection. In case of a femto cell, a connection could be provided over a separate cellular communication terminal, e.g., a 2G/3G/4G/5G modem.

In general, a UE is a device that is capable of communicating wirelessly. In particular, however, the UE may be a mobile UE, i.e., a UE that is suitable for being carried around by a user. For example, the UE may be a User Terminal (UT) or User Equipment (UE) within the meaning of the respective communication standards being used for mobile communication. For example, the UE may be a mobile phone, such as a smartphone, or another type of mobile communication device, such as a smartwatch, a laptop computer, a tablet computer, or autonomous augmented-reality glasses. For example, the UE and the RS may be configured to communicate in a cellular mobile communication system. Accordingly the UE and the RS may be configured to communicate in a cellular mobile communication system, for example, in a Sub-6GHz-based cellular mobile communication system (covering frequency bands between 500 MHz and 6 GHz) or in a mmWave-based cellular mobile communication system (covering frequency bands between 20 GHz and 60 GHz). For example, the UE and the RS may be configured to communicate in a mobile communication system/cellular mobile communication system. In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the UE may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the UE and the RS may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the UE and the RS may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the UE and the RS may be initiated using the protocols of the mobile communication system, or using a short-range communication system, such as via a wireless local area network.

As is evident from the above example, while the communication between UE and RS and between RS and base station primarily occurs via the mobile communication system, additional communication between the RS and the UE, or at least from the RS to the UE, occurs via a vehicular communication system. Such communication may be carried out directly, e.g., by using Device-to-Device (D2D) communication. Such communication, e.g., transmitting the information about the relaying service, is carried out using the specifications of the vehicular communication system. An example of D2D is direct communication between transportation vehicles, also referred to as Vehicle-to-Vehicle communication (V2V) or V2X, car-to-car, Dedicated Short Range Communication (DSRC), respectively. Technologies enabling such D2D-communication include 802.11p, 3GPP systems (4G, 5G, NR and beyond), etc.

Encoding 110 information about a relaying service in a vehicle-to-everything message can be performed by a processing circuitry of the RS. By encoding 110 the information about the relaying service in a V2X-message, the RS is enabled to transmit the information about the relaying service to the UE by use of a V2X-message known from other system. Transmitting 120 the vehicle-to-everything message to the UE to improve user equipment's awareness of the RS's relaying service can be performed by an interface of the RS. Thus, the UE can be informed in an improved way about a possible RS. For example, the information about the relaying service can be disseminated by use of ETSI standard instead of or additional to using 3GPP standards. For example, the V2X-message may be a CAM.

In an example, the information about the relaying service may be encoded in a container of a cooperative awareness message. In an example, the information about the relaying service may be encoded in an extension of a cooperative awareness message. For example, the information about the relaying service could be indicated as a new type of DE_StationType (A.78; ETSI TS 102 894-2 V1.2.1) or DE_VehicleRole (A94; ETSI TS 102 894-2 V1.2.1). For example, the information about the relaying service can be comprised by a new entry in the dictionary, e.g., the new entry could be added for relaying (service): such as RelayStation (0/1). Further, the information about the relaying service can be comprised by a container of the CAM. Further, for example, a description entry could be added to get more details of the relay service, e.g., a relaying characteristic such like a load of the RS offering the relaying service, an authorization level (restricted, unrestricted), etc. For example, parameters such like RelayLoad (%) to check for the less busy RS, RelayAuthorization (restricted, unrestricted), etc. can be comprised by the V2X-message such that a relaying service characteristic can be transmitted from the RS to the UE.

In an example, the information about the relaying service comprises information about a relaying service characteristic. For example, this information can be comprised by the parameter RelayLoad, RelayAuthorization, etc. A relaying service characteristic may be any parameter which could describe a communication link between the RS and UE or the UE and a BS via the RS, respectively. For example, the relaying service characteristic may include a maximal/minimal download/upload rate, an average data rate, a QoS, a pQoS, a load, authorization information, etc. Thus, the UE can receive all needed information for deciding if a relaying service offered from the RS is useful. For example, the UE can transmit a relaying request to the RS based on the received information about the relaying service characteristic.

In an example, the method 100 may further comprise receiving a vehicle-to-everything message from the user equipment comprising information about a relaying request. Further, the method 100 may comprise decoding the received vehicle-to-everything message and establishing a relaying service based on the received vehicle-to-everything message. This way, the RS can receive a request from the UE, which enables the RS to establish the relaying service. For example, the RS's relaying service may be restricted, e.g., by an authorization level (comprised by a parameter RelayAuthorization). The UE may transmit an authorization request (AR) to the RS, e.g., if the UE cannot establish a sufficient communication link to another BS or RS. The RS may need the AR from the UE to grant access to the relaying service for that specific UE. For example, the UE may repeat periodically a transmission of the AR addressed to the RS, e.g., after losing a sufficient communication link.

In an example, the received vehicle-to-everything message from the user equipment may further comprises information about a desired relaying service characteristic. Further, the method 100 may comprise selecting a relaying service for acting as relaying system for the user equipment based on the desired relaying service characteristic. This way, the RS can decide whether it can offer a desired relaying service characteristic to the UE or not. If the RS can offer a desired relaying service characteristic the RS may transmit an access grant information (AG) to the UE.

More details and facets are mentioned in connection with the embodiments described above and/or below. The example shown in FIG. 1 may comprise one or more optional additional features corresponding to one or more properties mentioned in connection with the proposed concept or one or more examples described below (e.g., FIG. 2—YYY).

Figure 2:
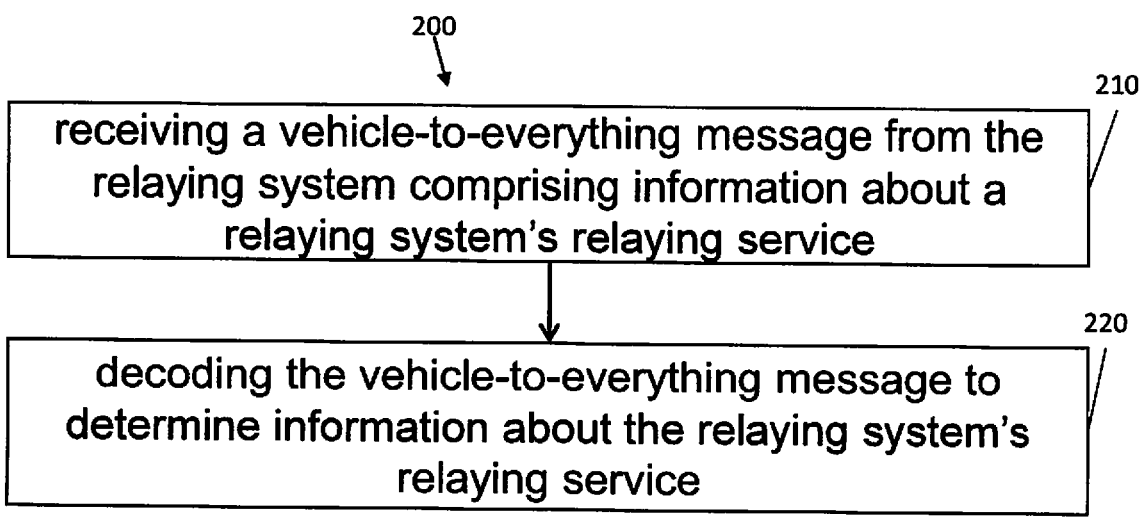
FIG. 2 shows an exemplary embodiment of a method for user equipment.

FIG. 2 shows an example of a method 200 for user equipment. The method 200 for improving a user equipment's awareness for a relaying system comprises receiving 210 a vehicle-to-everything message from the relaying system comprising information about a relaying system's relaying service and decoding 220 the vehicle-to-everything message to determine information about the relaying system's relaying service. This way, the UE can be informed about a possible relaying service by the RS in an improved way.

Decoding 220 information about a relaying service in a vehicle-to-everything message can be performed by a processing circuitry of the UE. By de coding 220 the information about the relaying service from a V2X-message, the UE is enabled to receive the information about the relaying service from the RS by use of a V2X-message known from other system. Receiving 210 the vehicle-to-everything message from the RS can be performed by an interface of the UE. Thus, the UE can receive information about a RS in an improved way.

In an example, the method 200 may further comprise receiving information about a type of the vehicle-to-everything message and sensing for this type of vehicle-to-everything message to receive information about a relaying system's relaying service. This way, the UE can be enabled to sense for a specific V2X-message, e.g., a CAM. This way, a sensing effort and thus an energy consumption of the UE can be reduced. For example, the UE may only sense for the specific V2X-message if an actual established communication link to a BS/RS is not sufficient, e.g., for a desired user service, such like streaming, gaming, video telephony, etc. or if no communication link can be established.

In an example, the information about a type of the vehicle-to-everything message is received from a network entity and/or the relaying system. This way, the UE can be informed in advance of a possible V2X-message that it senses if its current communication link is no longer sufficient.

In an example, the method 200 may further comprise encoding information about a relaying request in a vehicle-to-everything message and transmitting the vehicle-to-everything message to the relaying system. This way, the UE can request the relaying service from the RS actively, e.g., it can request an access for a restricted relaying service.

In an example, the method 200 may further comprise encoding information about a desired relaying service characteristic in the vehicle-to-everything message. As described above the RS can be enabled by receiving the information from the UE to select a specific relaying service to fulfill a need of the UE, e.g., a desired service of a UE's user.

In an example, the vehicle-to-everything message is a cooperative awareness message. For example, as described above the information about the relaying service, the relaying request, and/or the desired relaying service characteristic can be comprised by container, dictionary of a CAM.

More details and facets are mentioned in connection with the embodiments described above and/or below. The example shown in FIG. 2 may comprise one or more optional additional features corresponding to one or more properties mentioned in connection with the proposed concept or one or more examples described above (FIG. 1) and/or below (e.g., FIG. 3).

Figure 3:
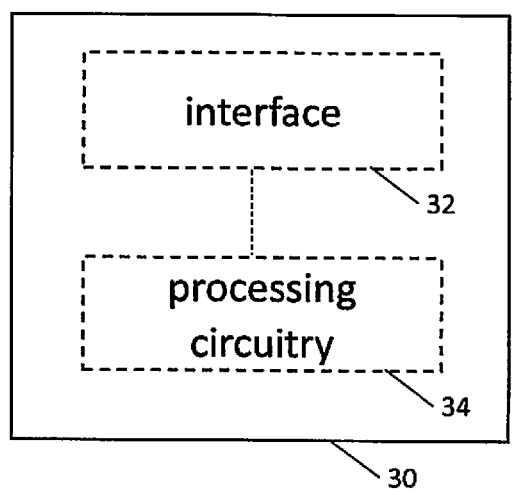
FIG. 3 shows a block diagram of an exemplary apparatus.

FIG. 3 shows a block diagram of an apparatus 30. The apparatus 30 comprises one or more interfaces 32 configured to communicate with user equipment or a relaying system. The apparatus 30 further comprises processing circuitry 34 configured to control the one or more interfaces and to perform the method for a RS or UE as described above (e.g., for the RS FIG. 1 or the UE FIG. 2).

For example, the apparatus 30 can be the RS, where the interface is configured to communicate with the user equipment. Alternatively, the apparatus 30 can be the UE, where the interface 32 is configured to communicate with the RS.

As shown in FIG. 3 the respective one or more interfaces 32 are coupled to the respective processing circuitry 34 at the apparatus 30. In examples the processing circuitry 34 may be implemented using one or more processing units, one or more processing devices, any method or mechanism for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34.

In an exemplary embodiment the apparatus 30 may comprise a memory and at least one processing circuitry 34 operably coupled to the memory and configured to perform the below mentioned method.

In examples the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, e.g., transmit or receive signals, information with further internal or external components. The one or more interfaces 32 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and facets are mentioned in connection with the embodiments described above. The example shown in FIG. 3 may comprise one or more optional additional features corresponding to one or more properties mentioned in connection with the proposed concept or one or more examples described above (FIG. 1-2).

The properties and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may, for example, be communicated using signaling radio bearers, e.g., by using Radio Resource Control (RRC) messages, which are, for example, specified in the *.331 series of 3GPP as layer 3 control plane messages. For example, physical layer specification, e.g., by using Doppler Delay Resolutions and other physical layer specifications may also be affected by present disclosed embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/ or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several operations or functions to a certain order. Furthermore, in further examples, a single operation, function, process or operation may include and/or be broken up into several sub-functions, -processes or -operations.

If some facets have been described in relation to a device or system, these facets should also be understood as a description of the corresponding method. For example, a block, device or functional property of the device or system may correspond to a feature, such as a method operation, of the corresponding method. Accordingly, properties described in relation to a method shall also be understood as a description of a corresponding block, a corresponding element, a property or a functional feature of a corresponding device or a corresponding system.

If some facets have been described in relation to a device or system, these properties should also be understood as a description of the corresponding method and vice versa. For example, a block, device or functional properties of the device or system may correspond to a feature, such as a method operation, of the corresponding method. Accordingly, facets described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

LIST OF REFERENCE SIGNS 30 apparatus
32 interface
34 processing circuitry
100 method for relay system
110 encoding information about a relaying service
120 transmitting the vehicle-to-everything message
200 method for user equipment
210 receiving a vehicle-to-everything message
220 decoding the vehicle-to-everything message

The invention claimed is:

1. An apparatus comprising:
one or more interfaces configured to communicate with user equipment or a relaying system; and
processing circuitry configured to control the one or more interfaces and to perform a method for improving relaying system awareness by user equipment, wherein the method includes:
encoding information about a relaying service in a vehicle-to-everything message,
transmitting a vehicle-to-everything message to the user equipment to improve user equipment's awareness of the relaying system's relaying service;
receiving a vehicle-to-everything message from the user equipment including information about a relaying request as well as information about a desired maximal and minimal download and upload rate, average data rate, quality of signal, predicted quality of signal, load and/or authorization information;
decoding the received vehicle-to-everything message; and
establishing a relaying service based on the received vehicle-to-everything message; and
selecting a relaying service for acting as a relaying system for the user equipment based on the desired maximal and minimal download and upload rate, average data rate, quality of signal, predicted quality of signal, load and/or authorization information.

2. A transportation vehicle comprising the apparatus of claim 1.

3. A non-transitory computer readable medium including a computer program having program code for performing the method of claim 1, when the computer program is executed on a computer, a processor, or a programmable hardware component.

4. The apparatus of claim 1, wherein the information about the relaying service is encoded in a container of a cooperative awareness message.

5. The apparatus of claim 1, wherein the information about the relaying service is encoded in an extension of a cooperative awareness message.

6. A method for a relaying system for improving relaying system awareness by user equipment, the method comprising:
encoding information about a relaying service in a vehicle-to-everything, wherein the information about the relaying service includes information about a relaying service characteristic; and
transmitting a vehicle-to-everything message to the user equipment to improve user equipment's awareness of the relaying system's relaying service;
receiving a vehicle-to-everything message from the user equipment including information about a relaying request as well as information about a desired maximal and minimal download and upload rate, average data rate, quality of signal, predicted quality of signal, load and/or authorization information;
decoding the received vehicle-to-everything message; and
establishing a relaying service based on the received vehicle-to-everything message; and
selecting a relaying service for acting as a relaying system for the user equipment based on the desired maximal and minimal download and upload rate, average data rate, quality of signal, predicted quality of signal, load and/or authorization information.

7. A non-transitory computer readable medium including a computer program having program code for performing the method of claim 6, when the computer program is executed on a computer, a processor, or a programmable hardware component.

8. The method of claim 6, wherein the information about the relaying service is encoded in a container of a cooperative awareness message.

9. The method of claim 6, wherein the information about the relaying service is encoded in an extension of a cooperative awareness message.

10. A method for user equipment for improving a user equipment's awareness for a relaying system, the method comprising:
    receiving a vehicle-to-everything message from the relaying system including information about a relaying system's relaying service, wherein the information about the relaying service is encoded in a vehicle-to-everything message;
    decoding the received vehicle-to-everything message to determine the information about the relaying system's relaying service;
    encoding information about a desired maximal and minimal download and upload rate, average data rate, quality of signal, predicted quality of signal, load and/or authorization information in another vehicle-to-everything message;
    transmitting the other vehicle-to-everything message to the relaying system;
    receiving information about a class of the vehicle-to-everything message; and
    sensing, for the class of vehicle-to-everything message to receive information about a relaying system's relaying service.

11. The method of claim 10, wherein the information about a class of the vehicle-to-everything message is received from a network entity and/or the relaying system.

12. The method of claim 10, wherein the vehicle-to-everything message is a cooperative awareness message.

13. The method of claim 10, wherein the information about the relaying service is encoded in a container of a cooperative awareness message.

14. The method of claim 10, wherein the information about the relaying service is encoded in an extension of a cooperative awareness message.

\* \* \* \* \*